United States Patent [19]
Chuang

[11] Patent Number: 5,213,719
[45] Date of Patent: May 25, 1993

[54] GAS-LIQUID CONTACTING DEVICE

[76] Inventor: Karl T. Chuang, 8742-117 St., Edmonton, AB, Canada, T6G 1R5

[21] Appl. No.: 952,098

[22] Filed: Sep. 28, 1992

[51] Int. Cl.$^5$ ............................................... B01F 3/04
[52] U.S. Cl. .................................................. 261/114.1
[58] Field of Search ...................................... 261/114.1

[56] References Cited

U.S. PATENT DOCUMENTS

| | | | |
|---|---|---|---|
| 2,682,395 | 6/1954 | Claridge et al. | 261/114.1 |
| 3,410,540 | 11/1968 | Bruckert | 261/114.1 |
| 3,434,701 | 3/1969 | Bauer | 261/114.1 |
| 4,089,752 | 5/1978 | Hancock, II | 261/114.1 |
| 4,954,294 | 9/1990 | Bannon | 261/114.1 |

Primary Examiner—Tim Miles
Attorney, Agent, or Firm—Francis W. Lemon

[57] ABSTRACT

A gas-liquid contacting device is provided having increased gas-liquid flow rate capacity. Each perforated tray is provided with an upstream downcomer in addition to, and immediately adjacent to the conventional downcomer which in this device forms a downstream downcomer. The upstream downcomer is provided with a perforated plate sealing the lower end at a height above the froth of the tray below.

8 Claims, 5 Drawing Sheets

GAS-LIQUID CONTACTING DEVICE

This invention relates to a gas-liquid contacting device.

BACKGROUND TO THE INVENTION

Perforated trays with downcomers are one of the most commonly used internals in industrial columns for contacting a gas and a liquid. In such a column, liquid flows across the trays and down through the downcomer from tray to tray while gas permeates upwardly through the trays foaming the liquid thereon. At low liquid flow rates, a single-downcomer is usually used for each tray. But, at high liquid flow rates, as in the case of pressure distillation and absorption, one downcomer may not be sufficient to handle the liquid flow and downcomer flooding may occur. Therefore, plural downcomers have to be installed for each tray, see, for example, "Use of Multiple Downcomer Trays to Increase Column Capacity", Union Carbide Corporation, 1983. Plural downcomers are conventionally arranged to separate the flowing liquid on the tray into two, four or even six passes, i.e., separate the flowing liquid into a number of different, shorter streams, each of which flows to a different downcomer. The disadvantages for this conventional arrangement can be divided into the following three aspects: (1) The complicated structure increases construction price, (2) The short liquid passage reduces liquid/vapor contact time on each tray, and thus lowers the tray efficiency, and (3) It is almost impossible to split the flow of liquid on a tray equally into two, four or six passes, and so severe vapor/liquid maldistribution on each tray can result.

Downcomer flooding may be caused by many factors, such as high tray pressure drop, unduly large fluid friction through each downcomer, and so on. However, the frictional head loss in each downcomer entrance region is probably to be the most significant. Thus, the downcomer capacity is probably mainly limited by the entrance friction.

There is a need for a gas-liquid contacting device wherein an increase in tray capacity is achieved by an increase in the liquid downcomer handling capacity and a reduction in the frictional head loss in the entrance region thereto.

SUMMARY OF THE INVENTION

According to the present invention there is provided a gas-liquid contacting device, comprising,
a) an upwardly extending casing,
b) a series of perforated trays partitioning the casing at different levels and having liquid drainage openings for, in operation, causing liquid descending in the casing to flow across the trays while being frothed on the trays by gas, to be contacted therewith, which is ascending in the casing and permeating the perforations of the trays, and
c) for each perforated tray,
  i) an overflow weir partitioning the drainage opening, transversely to the direction of liquid flow thereto, into downstream and upstream downcomer entries,
  ii) a downstream downcomer depending from the downstream entry to an outlet from that downcomer,
  iii) an upstream downcomer depending from the upstream entry to a liquid outlet that is above the level of liquid frothed from the downstream downcomer outlet, and
  iv) a liquid flow impeding, perforated plate for, in operation, forming a liquid pool of flowing liquid in a lower portion of the upstream downcomer and for distributing liquid from the pool over an unobstructed flow of liquid frothed from the downstream downcomer.

In some embodiments of the present invention a froth retaining weir is provided on the upstream side of each of the drainage openings.

In other embodiments of the present invention the casing is cylindrical, each drainage opening is shaped as a segment of a circle and the overflow weir divides the drainage opening so that the cross-section of the downstream downcomer is shaped as a relatively smaller segment of a circle to that of the drainage opening.

In yet other embodiments, for each perforated tray, a dividing baffle is provided sealed at one end to the casing and extending across that tray to provide a froth passage between the other end and the casing, and the liquid drainage openings of the trays are arranged for the downcomers to cause liquid to flow along one side of each baffle, through the froth passage, and then back along the other side of that baffle.

At least one upstream downcomer may be formed as a step between an upper and a lower riser to reduce the cross-sectional area of the passage therein in the direction of liquid flow therethrough, and the step may be perforated to be liquid permeable.

The step risers may be inclined to gradually reduce the downcomer passage cross-section in the direction of liquid flow therethrough.

A baffle may be provided forming an upward extension of the lower riser. The portion of each perforated tray that is immediately beneath each drainage opening may be imperforate to provide a baffle against upwardly flowing gas.

BRIEF DESCRIPTION OF THE DRAWINGS

In the accompanying drawings which illustrate, by way of example, embodiments of the present invention.

DETAILED DESCRIPTION OF THE PREFERRED EMBODIMENT

Figure 1:
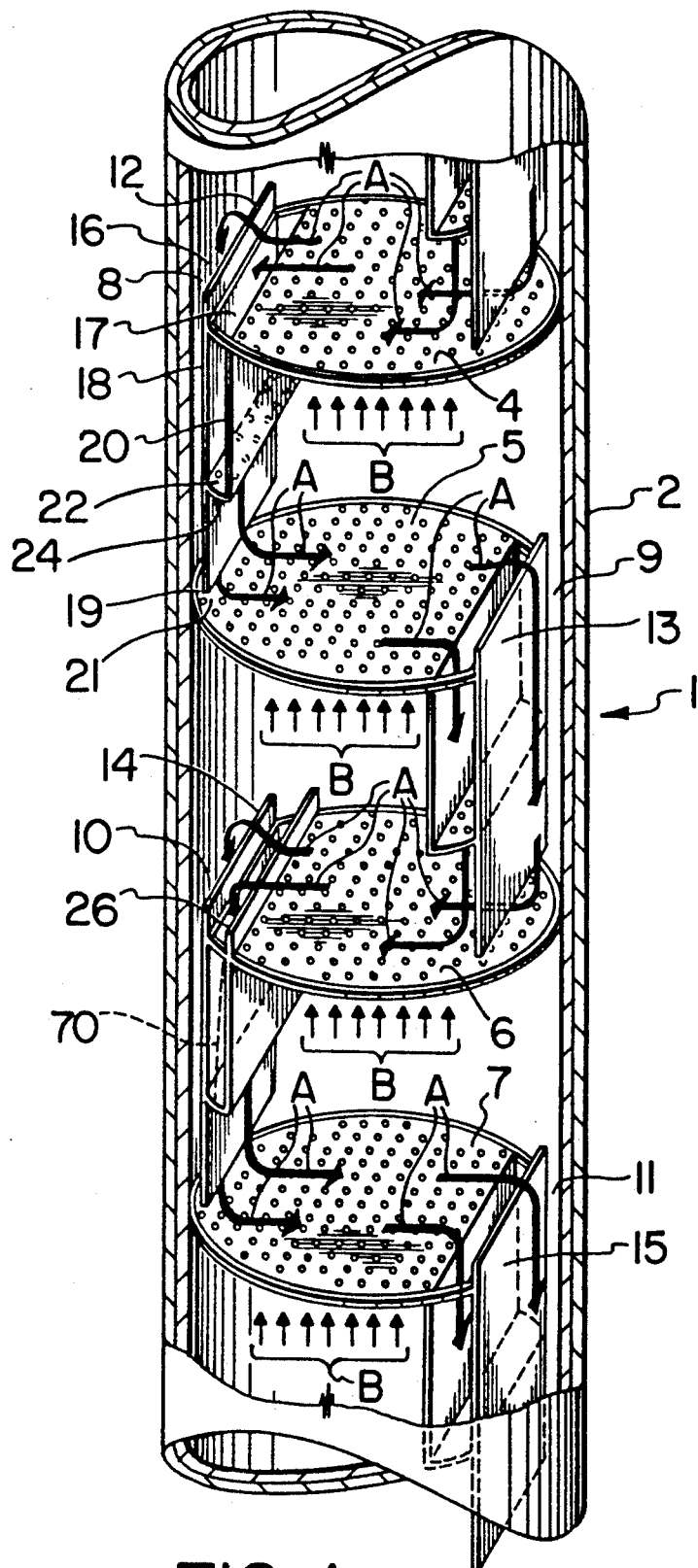
FIG. 1 is a perspective view of a lengthwise extending portion of a gas-liquid contacting device with a portion of the casing removed to reveal the interior.

In FIG. 1 there is shown a gas-liquid contacting device, generally designated 1, comprising,
a) an upwardly extending casing 2,
b) a series of perforated trays 4 to 7 partitioning the casing 2 at different levels and having liquid drainage openings, 8 to 11 respectively, for, in operation, causing liquid descending, as shown by arrows A, in the casing 2 to flow across the trays 4 to 7 while being frothed on the trays 4 to 7 by gas, to be contacted therewith, which is ascending in the casing 2, as shown by arrows B, and permeating the perforations of the trays 4 to 7, and c) for each perforated tray 4 to 7,
  i) an overflow weir, 12 to 15 respectively, partitioning the drainage opening, 8 to 11, transversely to the direction A of liquid flow thereto, into downstream and upstream downcomer entries, such as those designated 16 and 17 respectively for drainage opening 8,
  ii) a downstream downcomer, such as that designated 18, depending from the downstream entry 16 to an outlet 21 from the downcomer 18,
  iii) an upstream downcomer, such as that designated 20, depending from the upstream entry 17 to a liquid outlet 22 that is above the level of liquid frothed from the downstream downcomer outlet 21 from downstream downcomer 18, and
  iv) a liquid flow impeding, perforated plate, such as that designated 24, for, in operation, forming a liquid seal of flowing liquid in a lower portion of the upstream downcomer 20 and for distributing liquid over an unobstructed flow of liquid frothed from the downstream downcomer 18.

In this embodiment the casing 2 is cylindrical, each drainage opening 8 to 11 is shaped as a segment of a circle, and each overflow weir 12 to 15 divides the respective drainage opening 8 to 11 so that the cross-section of the downstream downcomer, such as that designated 16, is shaped as a relatively smaller segment of a circle to that of the drainage opening 8. Also, in this embodiment, the portion of each perforated tray 4 to 7, which is immediately beneath each drainage opening 8 to 11, such as portion 19, beneath drainage opening 8, is imperforate to provide a baffle against upwardly flowing gas.

In some embodiments, as will be discussed later, a froth retaining weir, such as that designated 26 for drainage opening 10, is provided on the upstream side of each of the drainage openings 8 to 11.

In operation, liquid is fed into an upper portion of the casing 2, to flow along the path indicated by arrows A, and exit from a lower end of the casing 2 in a known manner. Pressurized gas is fed into a lower portion of the casing 2, to flow upwardly along the path indicated by arrows B, and exit from the top of the casing 2 in a known manner.

As the liquid flows across the perforated trays 4 to 7 it is frothed by the gas flowing upwardly and permeating the perforated tray 4 to 7, thereby causing high surface area contact between the liquid and the gas. The frothed liquid moves across each tray as shown by arrows A, and a first portion of it is held back by the weirs 12 to 15 to flow down the upstream downcomers, such as upstream downcomer 17, while a second portion of the frothed liquid overflows the weirs 12 to 15 and flows down the downstream downcomers, such as downstream downcomer 16.

The frothed liquid flowing down the downstream downcomers, such as 16, leaves the downcomer by outlets, such as 21, to flow across, and be frothed on, the next, lower, perforated tray. The frothed liquid flowing into the upstream downcomers, such as 20, collects on the liquid flow impeding, perforated plates, such as 24, and form a liquid pool thereon against the upward flow of gas through the upstream downcomers, such as 20. Liquid from the pool is sprinkled on liquid frothed from the outlet 21.

Froth retaining weirs, such as 26, may be provided to assist in ensuring that a desirable thickness of froth layer is maintained on each of the perforated trays 4 to 7.

EXPERIMENTAL TESTS AND RESULTS

Figure 2:
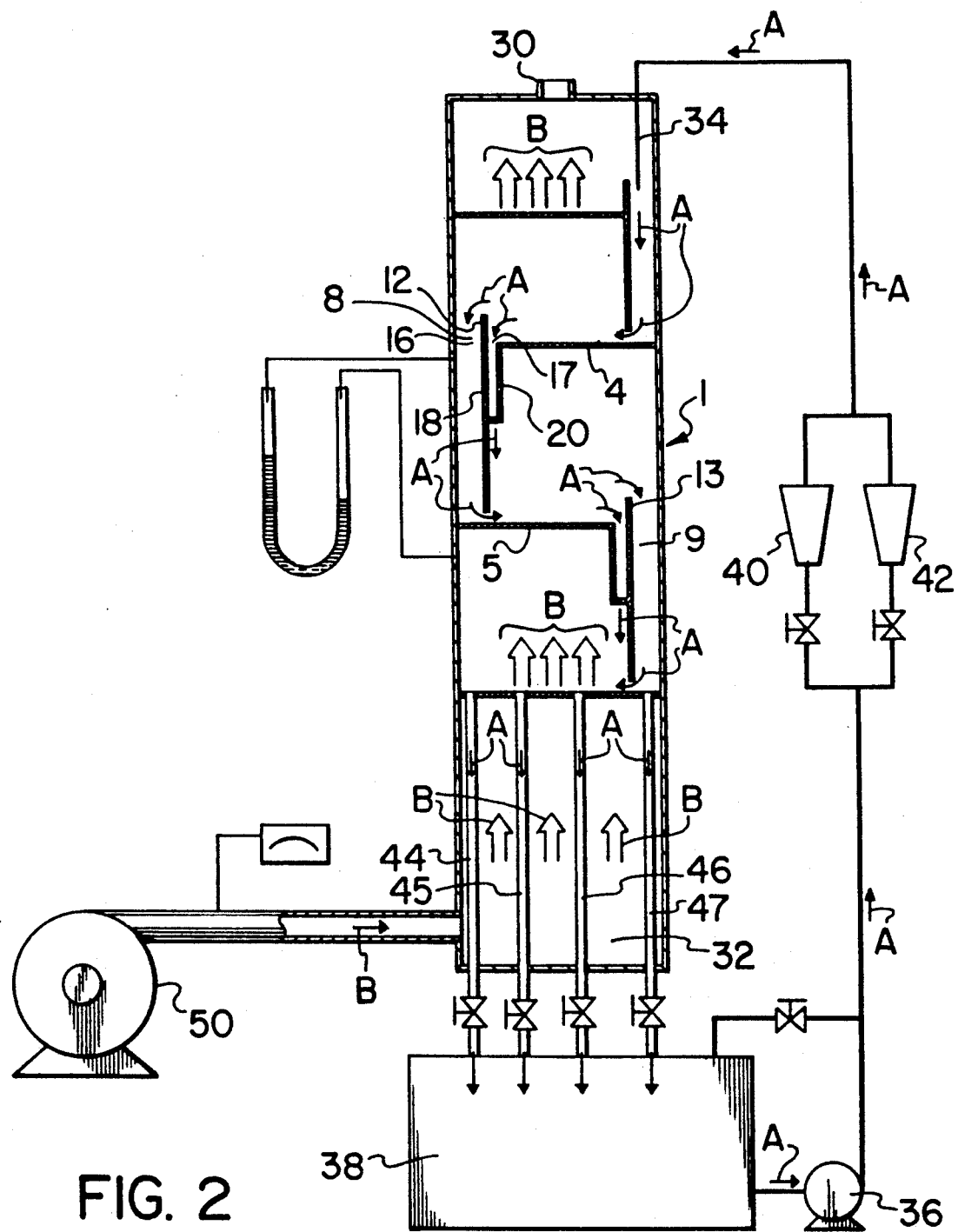
FIG. 2 is a schematic diagram of an experimental apparatus used to verify the present invention.

In FIG. 2, which shows an apparatus used to verify the present invention, similar parts to those shown in FIG. 1 are designated by the same reference numerals and the previous description is relied upon to describe them. In this apparatus, two test trays 4 and 5 were used.

In FIG. 2, the casing 2, which is of transparent resin material, had an upper, air vented end 30, and a lower, air plenum chamber 32. The upper end 30 had a water inlet 34, which was fed by a rotary pump 36, through flow rate measuring rotameters 40 and 42, with recirculated water from collecting tank 38. The lower end 32 had water drainage pipes 44 to 47 for draining water from a perforated tray 48, through the air plenum chamber 32, to the collecting tank 38. A rotary air blower 50 supplied pressurized air to the plenum chamber 32. The air flow rate from the blower 50 was measured by a hot-wire anemometer 52. A manometer 54 was used to measure the air pressure drop from beneath the tray 5 to above the tray 4.

In operation, during the tests, air was blown into the plenum chamber 34 by the blower 50, while water was circulated from the tank 38 to the top of the casing 2 through the inlet 34.

To start the tests, the water flow rate was set at a desired value, so that water flows downwardly through the trays 4, 5 and 48. The air blower 50 was then started up and the air flow gradually increased until the trays were observed through the transparent casing 2 to be flooded with frothing water.

The tests were carried out mainly on the effects on the downcomer handling capacity with respect to the downcomer suspension length and bottom, open end, cross-sectional area.

The tests, the air and water flow rates, tray pressure drop and froth height were recorded. The results were compared with a conventional, comparable gas-liquid contacting device sparing only a downstream downcomer.

The following tests were carried out and the results obtained from them are given.

Figure 3:
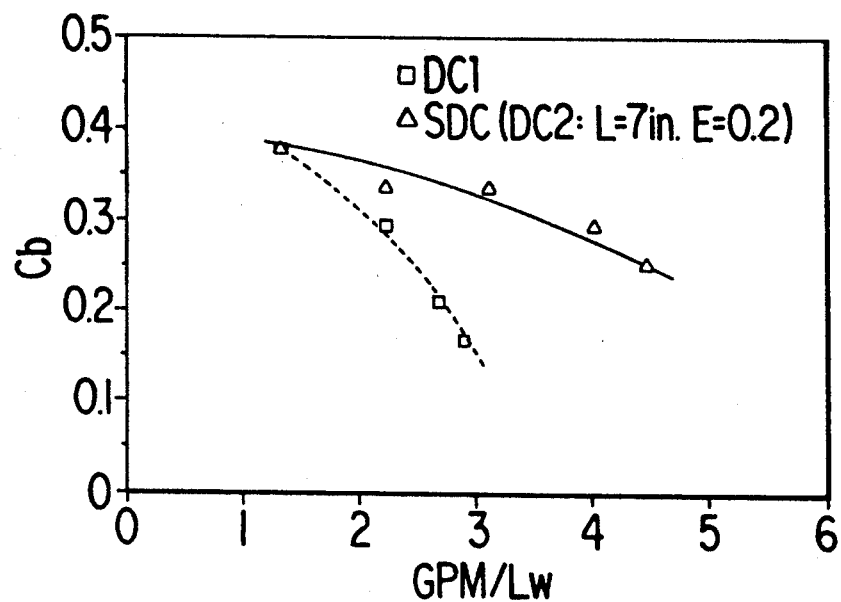
FIGS. 3 to 6 are graphs showing the liquid flow rate handling capacities, in terms of froth height, at different flow rates of a comparable, single, conventional, downcomer, gas-liquid contacting device compared to an apparatus according to the present invention.
Figure 4:
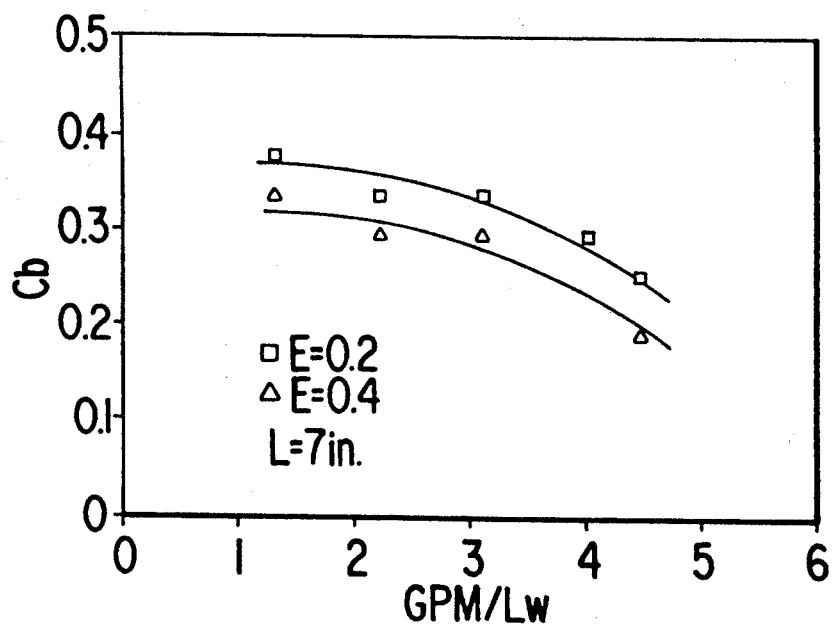
Figure 5:
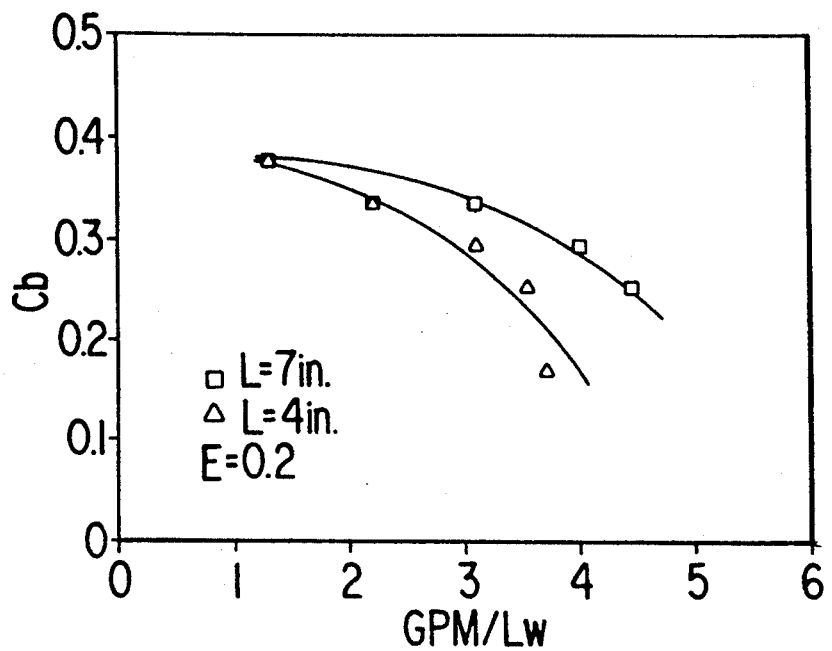

The following nomenclature is used in the graphs of FIGS. 3 to 6 of the results from the tests, $C_b$ = Downcomer capacity factor, $= V_b(p_v/(p_l - p_v))^{0.5}$
SDC = Two-step Downcomer (Upstream Downcomer + Downstream Downcomer)
E = Open hole area fraction at the bottom of the upstream downcomer
GPM = US gallon per minute. gal/min
L = Suspension length of the upstream downcomer in inches
Lw = Weir length, in.
$V_b$ = Vapor velocity based on bubbling area, ft/s
$p_l$ = Liquid density, lb/ft$^3$
$p_v$ = Vapor density, lb/ft$^3$
$\sigma$ = Liquid surface tension, dyn/cm a) Comparison of Single and Two-step Downcomer Capacity FIG. 3 shows graphically a comparison of the capacities of a single conventional downcomer device to that the applicant's two-step downcomer in FIG. 3, the downcomer capacity factor is plotted in inches against the liquid water flow rate GPM/Lw in gallons per minute. It will be seen that at low liquid flow rates, the capacity of the two devices was almost equal. The reason for this is that at low liquid flow rates, the clear liquid in the applicant's upstream downcomer was not sufficient to seal the downcomer bottom thereof, and the two-step downcomer performed like a conventional single downcomer. But, with increasing liquid flow rate, the upstream downcomer became sealed and the upstream downcomer contributed to extra liquid handling capacity. From FIG. 3 it will be seen that the capacity difference between the single and two-step downcomer becomes larger and larger with the increase in the liquid flow rate. At a downcomer capacity factor, $Cb=0.25$, the liquid flow rate through two-step downcomer was 80% higher than that through the single downcomer, while at a constant molar flow ratio of liquid to gas (i.e. $L/V=$constant), the liquid flow capacity was higher by 50%.

b) Effect of Bottom Open Area of the Upstream Downcomer on the Two-step Downcomer Capacity In this study, two different cross sectional areas (20 and 40%) at the bottom of upstream downcomer were used to test their effect on downcomer capacity. FIG. 4 shows that the capacity with 20% opening is larger than that with 40%. Tests results showed that, with 40% open area at the bottom of the upstream downcomer, the downcomer bottom thereof could not be completely sealed. Whenever the upstream downcomer was not sealed the capacity decreased. Therefore, the bottom open area needs to be carefully designed. Proper open area is chosen by considering gas/liquid flow rate, system properties, downcomer suspension length and top open area. In addition, it was found that if the upstream downcomer was designed, as will be described later, as a sloped downcomer where top cross-section area is greater than that of the bottom, this allowed for minimum interference of the gas flow and maximum separation of gas/liquid in the downcomer.

c) Effect of Suspension Length of the Upstream Downcomer on the Two-step Downcomer Capacity The two-step downcomer capacity with a 7 in. suspension length for the upstream downcomer was measured first. Then, the suspension length was cut from 7 to 4 in. The effect of suspension length of the upstream downcomer on the capacity is shown in FIG. 5. At low liquid flow rates, both of them could not be sealed well. As a result, their capacity was similar. But with increasing liquid flow rate, the downcomer with 7 in. length showed a higher capacity because it could be sealed in a better manner than that with a 4 in. length. In fact, when the tray was flooded, the pressure drop was usually more than 3 in. of water. Therefore, even at high liquid flow rates, the clear liquid in the upstream downcomer with 4 in. suspension height may not be enough to retain the pressure head. From this it would appear that the downcomer capacity will increase with the increasing of the suspension height as long as the upstream downcomer entrance friction is not a controlling factor. However, for best results, the froth on the tray below should not touch the bottom of the upstream downcomer.

d) Effect of Liquid Surface Tension on Downcomer Capacity

To study the effect of surface tension on downcomer capacity, the feed water containing ppm level of surfactant was tested. The surface tension of the liquid was measured to be 56 dyn/cm. Table 1 shows that the capacity of both single and two-step downcomer decreases with decreasing liquid surface tension, but the applicant's two-step downcomer capacity decreases much less than that of the conventional single downcomer.

TABLE 1

| Effect of Liquid Surface Tension on Downcomer Capacity $Vb = 4.84$ ft/s ||||
|---|---|---|---|
| DC1, GPM/Lw || SDC*, GPM/Lw ||
| $\sigma = 72$ | $\sigma = 56$ | $\sigma = 72$ | $\sigma = 56$ |
| 2.91 | 1.34 | 4.48 | 3.58 |

Figure 6:
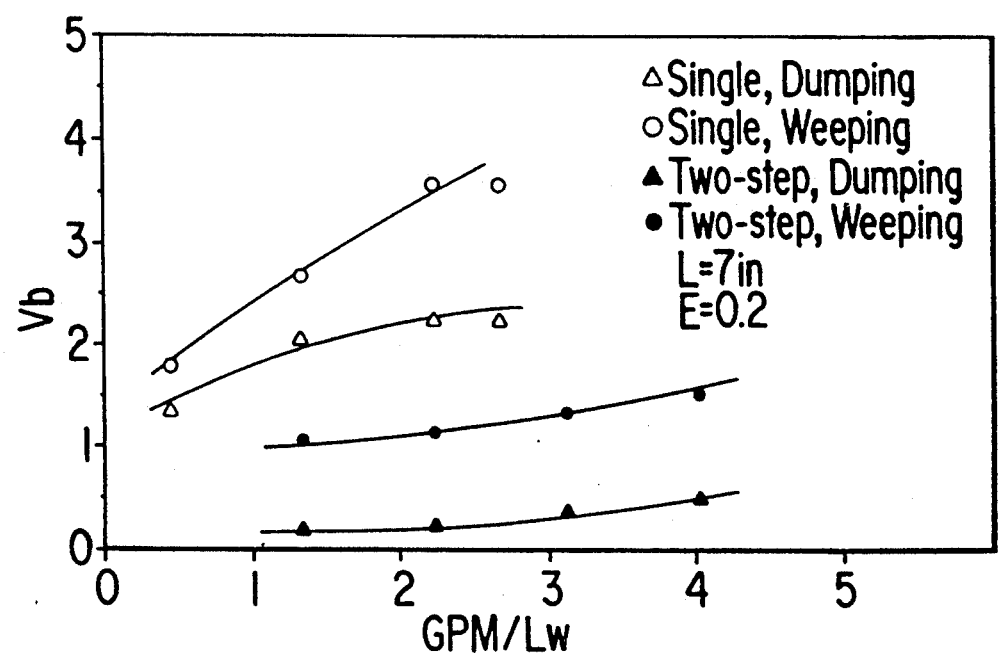

*DC2: L = 7 in., E = 0.4 e) Comparison of Weeping and Dumping of Sieve Tray with Single and Two-step Downcomer FIG. 6 shows that both weeping and dumping point of the tray with two-step downcomer are much lower than those of single downcomer tray. In fact, it was very difficult to observe the dumping point of the tray with two-step downcomer, because there was no outlet weir for the upstream downcomer, most of the liquid on the tray dripped through the upstream downcomer. At low gas flow rates, there was only a thin layer of liquid on the tray. Therefore, for the tray with the applicant's two-step downcomer the weep and dump points occurred at a much lower gas flow rate than that with conventional downcomer.

Conclusion

The test results showed that the capacity can be increased by replacing the conventional downcomer with the applicant's two-step downcomer. The capacity was found to increase with the two-step downcomer by 50% at constant liquid to gas ratio and by 80% at a constant gas flow rate, $Cb=0.25$. The lower limit of the tray operation with the two-step downcomer is much lower than that with the conventional downcomer. This results in a much wider operating range and higher turndown ratio for a tray column. The upstream downcomer should be carefully designed so that it can be self-sealed. It is preferable that the upstream downcomer be sloped, as will be described later, to minimize the interference with the gas flow.

Figure 7:
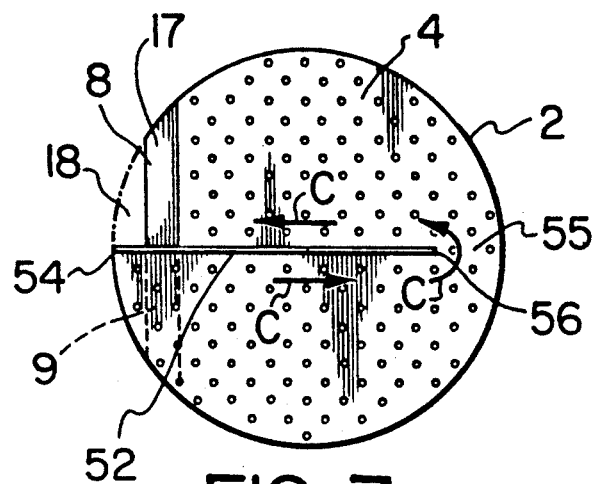
FIGS. 7 to 9 are schematic views of different embodiments of the present invention.

In FIG. 7, similar parts to those shown in FIG. 1 are designated by the same reference numerals and the previous description is relied upon to describe them.

In FIG. 7, a dividing baffle 52 is sealed at one end 54 to the casing 2 and extends across the tray 4 to provide a froth passage 55 between the other end 56 and the casing 2 and the liquid drainage openings, such as 8 and 9, are arranged for the downcomers, such as 17 and 18, to cause liquid to flow along one side of each baffle 52, through the froth passage 55, and then back along the other side of that baffle 52 as shown by arrows.

Figure 8:
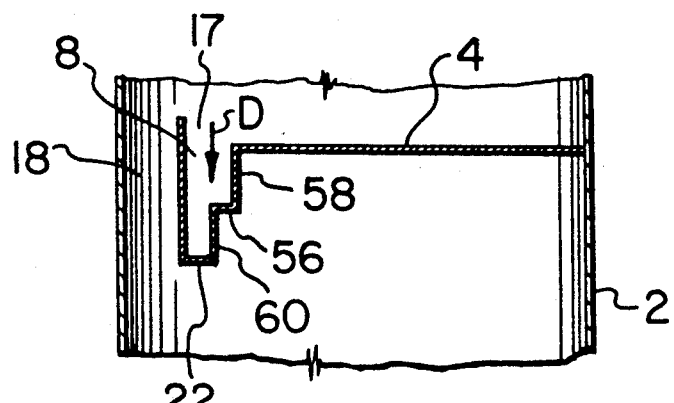

In FIG. 8, the upstream downcomer 17 is formed as a step 56 between an upper riser 58 and a lower riser 60 to reduce the cross-sectional area of the passage therein in the direction D of liquid flow therethrough, and the step 56 is perforated to be liquid permeable.

Figure 9:
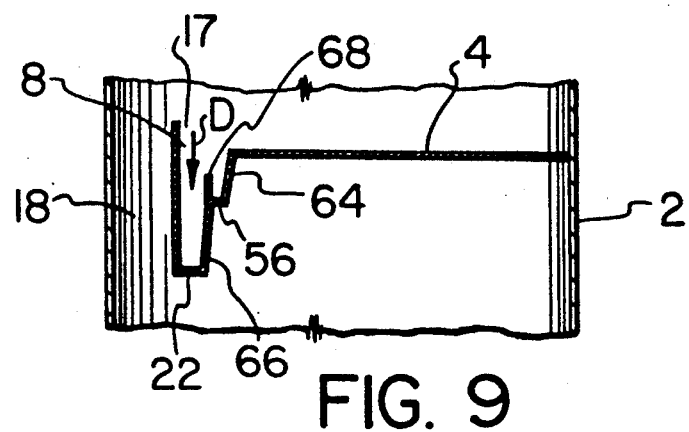

In FIG. 9, where similar parts to those shown in FIG. 8 are designated by the same reference numerals and the previous description is relied upon to describe them, the risers 64 and 66 are inclined to gradually reduce the downcomer passage cross-section in the direction D of liquid flow therethrough.

If desired, a baffle 68 may be provided forming an upward extension of the lower riser 66.

It is within the scope of the present invention for the upstream downcomer shown in FIG. 1 to be inclined as is shown chain-dotted and designated 70.

The present invention can increase the capacity of not only the conventional 1, 2, 3 and 4-pass trays but also the improved cross-flow trays such as those patented by Nye (U.S. Pat. No. 5,047,179), Chuang and Everatt (U.S. Pat. No. 4,504,426) as well as Binkley et al. (U.S. Pat. No. 4,956,127).

What is claimed is:

1. A gas-liquid contacting device, comprising,
   a) and upwardly extending casing,
   b) a series of perforated trays partitioning the casing at different levels and having liquid drainage openings for, in operation, causing liquid descending in the casing to flow across the trays while being frothed on the trays by gas, to be contacted therewith, which is ascending in the casing and permeating the perforations of the trays, and
   c) for each perforated tray,
      i) an overflow weir partitioning the drainage opening, transversely to the direction of liquid flow thereto, into downstream and upstream downcomer entries,
      ii) a downstream downcomer depending from the downstream entry to an outlet from that downcomer,
      iii) an upstream downcomer depending from the upstream entry to a liquid outlet that is above the level of liquid frothed from the downstream downcomer outlet, and
      iv) a liquid flow-impending, perforated plate for, in operation, forming a liquid pool of flowing liquid in a lower portion of the upstream downcomer and for distributing liquid from the pool over an unobstructed flow of liquid frothed from the downstream downcomer.

2. A device according to claim 1, further comprising a froth retaining weir on the upstream side of each of the drainage openings.

3. A device according to claim 1, wherein the casing is cylindrical, each drainage opening is shaped as a segment of a circle, and the overflow weir divides the drainage opening so that the cross-section of the downstream downcomer is shaped as a relatively smaller segment of a circle to that of the drainage opening.

4. A device according to claim 1, further comprising, for each perforated tray, a dividing baffle seated at one end to the casing and extending across that tray to provide a froth passage between the other end and the casing, and the liquid drainage openings of the trays are arranged for the downcomer to cause liquid to flow along one side of each baffle, through the froth passage, and then back along the other side of that baffle.

5. A device according to claim 1, wherein the portion of each perforated tray that is immediately beneath each drainage opening is imperforate for, in operation, providing a baffle against upwardly flowing gas.

6. A device according to claim 1, wherein at least one upstream downcomer is formed as a step between an upper and a lower riser to reduce the cross-sectional area of the passage therein in the direction of liquid flow therethrough, and the step is perforated to be liquid permeable.

7. A device according to claim 6, further comprising a baffle forming an upward extension of the lower riser.

8. A device according to claim 6, wherein the step risers are inclined to gradually reduce the downcomer passage cross-section in the direction of liquid flow therethrough.

* * * * *